(12) United States Patent
De Bock

(10) Patent No.: US 12,003,744 B2
(45) Date of Patent: Jun. 4, 2024

(54) HIERARCHICAL SURVEILANCE VIDEO COMPRESSION REPOSITORY

(71) Applicant: Sensormatic Electronics, LLC, Boca Raton, FL (US)

(72) Inventor: Thibaut De Bock, Spring Hill, TN (US)

(73) Assignee: Sensormatic Electronics, LLC, Boca Raton, FL (US)

(*) Notice: Subject to any disclaimer, the term of this patent is extended or adjusted under 35 U.S.C. 154(b) by 236 days.

(21) Appl. No.: 17/509,940

(22) Filed: Oct. 25, 2021

(65) Prior Publication Data

US 2023/0127006 A1    Apr. 27, 2023

(51) Int. Cl.
| | |
|---|---|
| *G06F 16/00* | (2019.01) |
| *G06F 16/22* | (2019.01) |
| *H04N 19/136* | (2014.01) |
| *H04N 19/176* | (2014.01) |
| *H04N 19/426* | (2014.01) |
| *H04N 19/91* | (2014.01) |

(Continued)

(52) U.S. Cl.
CPC ....... *H04N 19/426* (2014.11); *G06F 16/2246* (2019.01); *H04N 19/136* (2014.11); *H04N 19/176* (2014.11); *H04N 19/91* (2014.11); *G06F 16/783* (2019.01); *H04N 7/18* (2013.01)

(58) Field of Classification Search
CPC .. H04N 19/426; H04N 19/136; H04N 19/176; H04N 19/91; H04N 7/18; H04N 7/181; H04N 19/503; H04N 21/234318; H04N 21/845; H04N 21/8153; H04N 19/23; G06F 16/2246; G06F 16/783
See application file for complete search history.

(56) References Cited

U.S. PATENT DOCUMENTS

2021/0211715 A1* 7/2021 Chen .................. H04N 19/52

FOREIGN PATENT DOCUMENTS

| CN | 106550237 A | 3/2017 |
|---|---|---|
| EP | 2782340 A1 | 9/2014 |

OTHER PUBLICATIONS

Gao et al., "The IEEE 1857 Standard: Empowering Smart Video Surveillance Systems," IEEE Intelligent Systems, Sep. 2014, vol. 29, No. 5, pp. 30-39.

(Continued)

*Primary Examiner* — Tyler J Torgrimson
(74) *Attorney, Agent, or Firm* — ArentFox Schiff LLP

(57) ABSTRACT

Apparatus and methods for processing video surveillance data includes training a data repository, using a first plurality of surveillance video files including a first plurality of video frames, to identify macroblocks of the video frames representing average content of the first plurality of surveillance video files. An ordered data structure is generated by sorting the plurality of macroblocks of video frames based on image differences within the plurality of macroblocks. The ordered data structure includes a root node. A second plurality of surveillance video files including a second plurality of video frames is received. The second plurality of video frames is inserted into the generated ordered data structure. References to the generated ordered data structure are stored in the data store for each frame of the second plurality of video frames along with a difference between corresponding video frames and references.

14 Claims, 4 Drawing Sheets

(51) Int. Cl.
*G06F 16/783* (2019.01)
*H04N 7/18* (2006.01)

(56) References Cited

OTHER PUBLICATIONS

International Search Report in PCT/US2022/078268, dated Jan. 31, 2023, 5 pages.
Tu et al., "Box-based codebook model for real-time objects detection," Proceedings of the 7th World Congress on Intelligent Control and Automation, Jun. 2008, pp. 7621-7625.

* cited by examiner

HIERARCHICAL SURVEILANCE VIDEO COMPRESSION REPOSITORY

TECHNICAL FIELD

The present disclosure generally relates to the field of security cameras, and more specifically, to hierarchical surveillance video compression repository.

BACKGROUND

Surveillance technology has been increasingly used to monitor people, places and activities. For example, high-quality surveillance video is being used to better monitor events and/or to reduce visually distracting artifacts that may interfere with human recognition. As surveillance video data is retained and archived for longer periods of time, large amounts of data storage space are typically needed. In addition, more innovative applications are emerging in which the streaming of video to wireless and mobile devices is used over evermore bandwidth-constrained networks. Such uses are demanding not only new surveillance solutions, but also new or enhanced video compression techniques.

Presently, video compression techniques work at an individual file level. However, in archiving surveillance video, there are many duplicate video frames because each video clip is stored individually.

In view of the foregoing, there is a need to more efficiently store video surveillance data.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

The present disclosure relates to a video data repository that can extract and compress the video context as a whole rather than at an individual file level. In some cases, the disclosed repository may store primarily surveillance video where the scene and data is mostly static.

One example implementation relates to a method for processing video surveillance data. One aspect of the method includes training a data repository, using a first plurality of surveillance video files including a first plurality of video frames, to identify macroblocks of the video frames representing average content of the first plurality of surveillance video files. An ordered data structure is generated by sorting the plurality of macroblocks of video frames based on image differences within the plurality of macroblocks. The ordered data structure includes a root node. A second plurality of surveillance video files including a second plurality of video frames is received. The second plurality of video frames is inserted into the generated ordered data structure. References to the generated ordered data structure are stored in the data store for each frame of the second plurality of video frames along with a difference between corresponding video frames and references.

Additional advantages and novel features relating to implementations of the present disclosure will be set forth in part in the description that follows, and in part will become more apparent to those skilled in the art upon examination of the following or upon learning by practice thereof.

DESCRIPTION OF THE FIGURES

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

Conventional video compression standards work with video files on a frame by frame basis. This disclosure relates to systems, devices, and methods for managing, processing and storing video files on a video by video basis within the context of entire video data, especially for video surveillance purposes. Hierarchical surveillance video compression repository systems and methods in accordance with the present disclosure can improve upon existing systems by efficiently storing each frame data in a format that can be easily queried. Advantageously, this approach can significantly reduce data storage requirements for providing video surveillance functionality.

Figure 1:
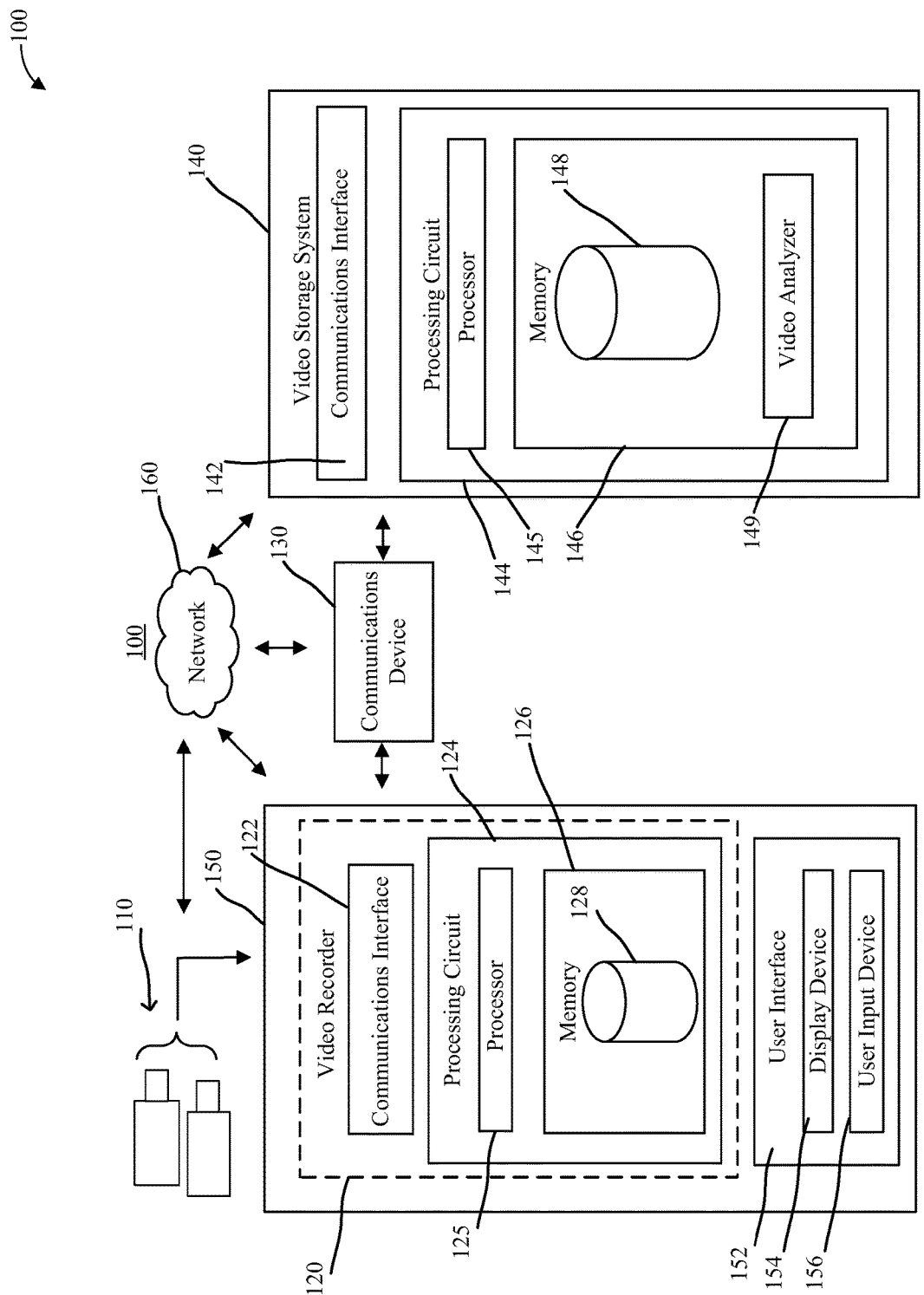
FIG. 1 is an example of a block diagram of a video surveillance storage system according to an aspect of the present disclosure.

Referring now to FIG. 1, a video surveillance storage environment 100 is shown according to an aspect of the present disclosure. Briefly, the video surveillance storage environment 100 includes a plurality of image capture devices 110, a video recorder 120, a communications device 130, a video storage system 140, and one or more client devices 150.

Each image capture device 110 includes an image sensor, which can detect an image. The image capture device 110 can generate an output signal including one or more detected frames of the detected images, and transmit the output signal to a remote destination. For example, the image capture device 110 can transmit the output signal to the video recorder 120 using a wired or wireless communication protocol.

The output signal can include a plurality of images, which the image capture device 110 may arrange as an image stream (e.g., video stream). The image capture device 110 can generate the output signal (e.g., network packets thereof) to provide an image stream including a plurality of image frames arranged sequentially by time. Each image frame can include a plurality of pixels indicating brightness and color information. In some aspects, the image capture device 110 assigns an indication of time (e.g., time stamp) to each image of the output signal. In some aspects, the image sensor of the image capture device 110 captures an image based on a time-based condition, such as a frame rate or shutter speed.

In some aspects, the image sensor of the image capture device 110 may detect an image responsive to a trigger condition. The trigger condition may be a command signal to capture an image (e.g., based on user input or received from video recorder 120).

The trigger condition may be associated with motion detection. For example, the image capture device 110 can include a proximity sensor, such that the image capture device 110 can cause the image sensor to detect an image responsive to the proximity sensor outputting an indication of motion. The proximity sensor can include sensor(s) including but not limited to infrared, microwave, ultrasonic, or tomographic sensors.

Each image capture device 110 can define a field of view, representative of a spatial region from which light is received and based on which the image capture device 110 generates each image. In some aspects, the image capture device 110 has a fixed field of view. In some aspects, the image capture device 110 can modify the field of view, such as by being configured to pan, tilt, and/or zoom.

The plurality of image capture devices 110 can be positioned in various locations, such as various locations in a building. In some aspects, at least two image capture devices 110 have an at least partially overlapping field of view; for example, two image capture devices 110 may be spaced from one another and oriented to have a same point in their respective fields of view.

The video recorder 120 receives an image stream (e.g., video stream) from each respective image capture device 110, such as by using a communications interface 122. In some aspects, the video recorder 120 is a local device located in proximity to the plurality of image capture devices 110, such as in a same building as the plurality of image capture devices 110.

The video recorder 120 can use the communications device 130 to selectively transmit image data based on the received image streams to the video storage system 140, e.g., via network 160. The communications device 130 can be a gateway device. The communications interface 122 (and/or the communications device 130 and/or the communications interface 142 of video storage system 140) can include wired or wireless interfaces (e.g., jacks, antennas, transmitters, receivers, transceivers, wire terminals, etc.) for conducting data communications with various systems, devices, or networks. For example, the communications interface 122 may include an Ethernet card and/or port for sending and receiving data via an Ethernet-based communications network (e.g., network 160). In some aspects, communications interface 122 includes a wireless transceiver (e.g., a WiFi transceiver, a Bluetooth transceiver, a NFC transceiver, ZigBee, etc.) for communicating via a wireless communications network (e.g., network 160). The communications interface 122 may be configured to communicate via network 160, which may be associated with local area networks (e.g., a building LAN, etc.) and/or wide area networks (e.g., the Internet, a cellular network, a radio communication network, etc.) and may use a variety of communications protocols (e.g., BACnet, TCP/IP, point-to-point, etc.).

The processing circuit 124 includes a processor 125 and memory 126. The processor 125 may be a general purpose or specific purpose processor, an application specific integrated circuit (ASIC), one or more field programmable gate arrays (FPGAs), a group of processing components, or other suitable processing components. The processor 125 may be configured to execute computer code or instructions stored in memory 126 (e.g., RAM, etc.) or received from other computer readable media (e.g., CDROM, network storage, a remote server, etc.) to perform one or more of the processes described herein. The memory 126 may include one or more data storage devices (e.g., memory units, memory devices, computer-readable storage media, etc.) configured to store data, computer code, executable instructions, or other forms of computer-readable information. The memory 126 may include random access memory (RAM), read-only memory (ROM), hard drive storage, temporary storage, non-volatile memory, flash memory, optical memory, or any other suitable memory for storing software objects and/or computer instructions. The memory 126 may include database components, object code components, script components, or any other type of information structure for supporting the various activities and information structures described in the present disclosure. The memory 126 may be communicably connected to the processor 125 via the processing circuit 124 and may include computer code for executing (e.g., by processor 125) one or more of the processes described herein. The memory 126 can include various modules (e.g., circuits, engines) for completing processes described herein.

The processing circuit 144 includes a processor 145 and memory 146, which may implement similar functions as the processing circuit 124. In some aspects, a computational capacity of and/or data storage capacity of the processing circuit 144 is greater than that of the processing circuit 124.

The processing circuit 124 of the video recorder 120 can selectively store image frame(s) of the image streams from the plurality of image capture devices 110 in a local image database 128 of the memory 126 based on a storage policy. The processing circuit 124 can execute the storage policy to increase the efficiency of using the storage capacity of the memory 126, while still providing selected image frame(s) for presentation or other retrieval as quickly as possible by storing the selected image frame(s) in the local image database 128 (e.g., as compared to maintaining images frames in remote image repository 148 and not in local image database 128). The storage policy may include a rule such as to store image frame(s) from an image stream based on a sample rate (e.g., store n images out of every consecutive m images; store j images every k seconds).

The storage policy may include a rule such as to adjust the sample rate based on a maximum storage capacity of memory 126 (e.g., a maximum amount of memory 126 allocated to storing image frame(s)), such as to decrease the sample rate as a difference between the used storage capacity and maximum storage capacity decreases and/or responsive to the difference decreasing below a threshold difference. The storage policy may include a rule to store a compressed version of each image frame in the local image database 128; the video storage system 140 may maintain more efficiently compressed (or less compressed) image frames in the remote image repository 148.

In some aspects, the storage policy includes a rule to store image frame(s) based on a status of the image frame(s). For example, the status may indicate the image frame(s) were captured based on detecting motion, such that the processing circuit 124 stores image frame(s) that were captured based on detecting motion.

In some aspects, the processing circuit 124 defines the storage policy based on user input. For example, the client device 150 can receive a user input indicative of the sample rate, maximum amount of memory to allocate to storing image streams, or other parameters of the storage policy, and the processing circuit 124 can receive the storage input and define the storage input based on the user input.

The processing circuit 124 can assign, to each image frame stored in the local image database 128, an indication of a source of the image frame. The indication of a source may include an identifier of the image capture device 110 from which the image frame was received, as well as a location identifier (e.g., an identifier of the building). In some aspects, the processing circuit 124 maintains a mapping in the local image database 128 of indications of source to buildings or other entities—as such, when image frames are requested for retrieval from the local image database 128, the processing circuit 124 can use the indication of source to identify a plurality of streams of image frames to output that are associated with one another, such as by being associated with a plurality of image capture devices 110 that are located in the same building.

As discussed above, the video storage system 140 may maintain many or all image frame(s) received from the image capture devices 110 in the remote image repository 148. The video storage system 140 may maintain, in the remote image repository 148, mappings of image frame(s) to other information, such as identifiers of image sources, identifiers of buildings or other entities, or references to most representative macroblocks of frames, as explained below.

In some aspects, the video storage system 140 uses the processing circuit 144 to execute a video analyzer 149. The processing circuit 144 can execute the video analyzer 149 to identify a set of most representative macroblocks across all image frames. Responsive to executing the video analyzer 149 to identify the set of most representative macroblocks, the processing circuit 144 can assign an indication of difference from the set of most representative macroblocks to the corresponding image frame.

For example, the video analyzer 149 can include a training algorithm that identifies one or more macroblocks of the image frames representing average content of the corresponding video file by analyzing each image frame. When the video analyzer 149 completes the training stage, it may start comparing image frames within new video files received from the video recorder 120 with previously determined macroblocks of the image frames representing average content of the corresponding video file. In an aspect, the video analyzer 149 may identify differences in the image frame responsive to the comparison indicating a difference in the identified frames with respect to macroblocks of the image frames representing average content of the corresponding video file that is greater than a difference threshold. In some aspects, the video analyzing algorithm of the video analyzer 149 includes a machine learning algorithm that has been trained to identify image frames representing average content of the corresponding video file. In an optional aspect, the video analyzer 149 can include a motion detector algorithm, which may identify objects in each image frame, and compare image frames (e.g., across time) to determine a change in a position of the identified objects, which may indicate a removed or deposited item.

In some embodiments, the video analyzer 149 includes an ordered data structure generation algorithm. Such data structure may map differences between each image frame based on predetermined image frames representing average content of the corresponding video file. The processing circuit 144 can execute the data structure generation algorithm of the video analyzer 149 to sort the plurality of macroblocks of image frames based on image differences within the corresponding plurality of macroblocks across all stored video files. In an aspect, the generated ordered data structure may have a root node, referred to hereinafter as a lead frame.

As shown in FIG. 1, the client device 150 may implement the video recorder 120; for example, the client device 150 can include the processing circuit 124. It will be appreciated that the client device 150 may be remote from the video recorder 120, and communicatively coupled to the video recorder 120 to receive image frames and other data from the video recorder 120 (and/or the video storage system 140); the client device 150 may thus include a processing circuit distinct from processing circuit 124 to implement the functionality described herein.

The client device 150 includes a user interface 152. The user interface 152 can include a display device 154 and a user input device 156. In some aspects, the display device 154 and user input device 156 are each components of an integral device (e.g., touchpad, touchscreen, device implementing capacitive touch or other touch inputs). The user input device 156 may include one or more buttons, dials, sliders, keys, or other input devices configured to receive input from a user. The display device 154 may include one or more display devices (e.g., LEDs, LCD displays, etc.). The user interface 152 may also include output devices such as speakers, tactile feedback devices, or other output devices configured to provide information to a user. In some aspects, the user input device 156 includes a microphone, and the processing circuit 124 includes a voice recognition engine configured to execute voice recognition on audio signals received via the microphone, such as for extracting commands from the audio signals.

The client device 150 can generate and present the user interface 152 based on information received from video recorder 120 and/or video storage system 140. The client device 150 can generate a video request including an indication of a video time to request the corresponding image frames stored in the remote image repository 148. In some aspects, the video request includes an indication of an image source identifier, such as an identifier of one or more of the plurality of image capture devices 110, and/or an identifier of a location or building.

The remote image repository 148 can use the request as a key to retrieve the corresponding image frames (e.g., an image frame from each appropriate image capture device 110 at a time corresponding to the indication of the video time) and provide the corresponding image frames to the client device 150. As such, the remote image repository 148 may be configured to identify a closest in time and content image frame(s) based on the request from the client device 150 to provide to the client device 150. The remote image repository 148 can use the table of difference between the corresponding video frames and references with the remote image repository 148 that are within the indication of time of the request received from the client device 150. As such, the client device 150 can efficiently retrieve image frames of interest from the remote image repository 148 as desired.

Figure 2:
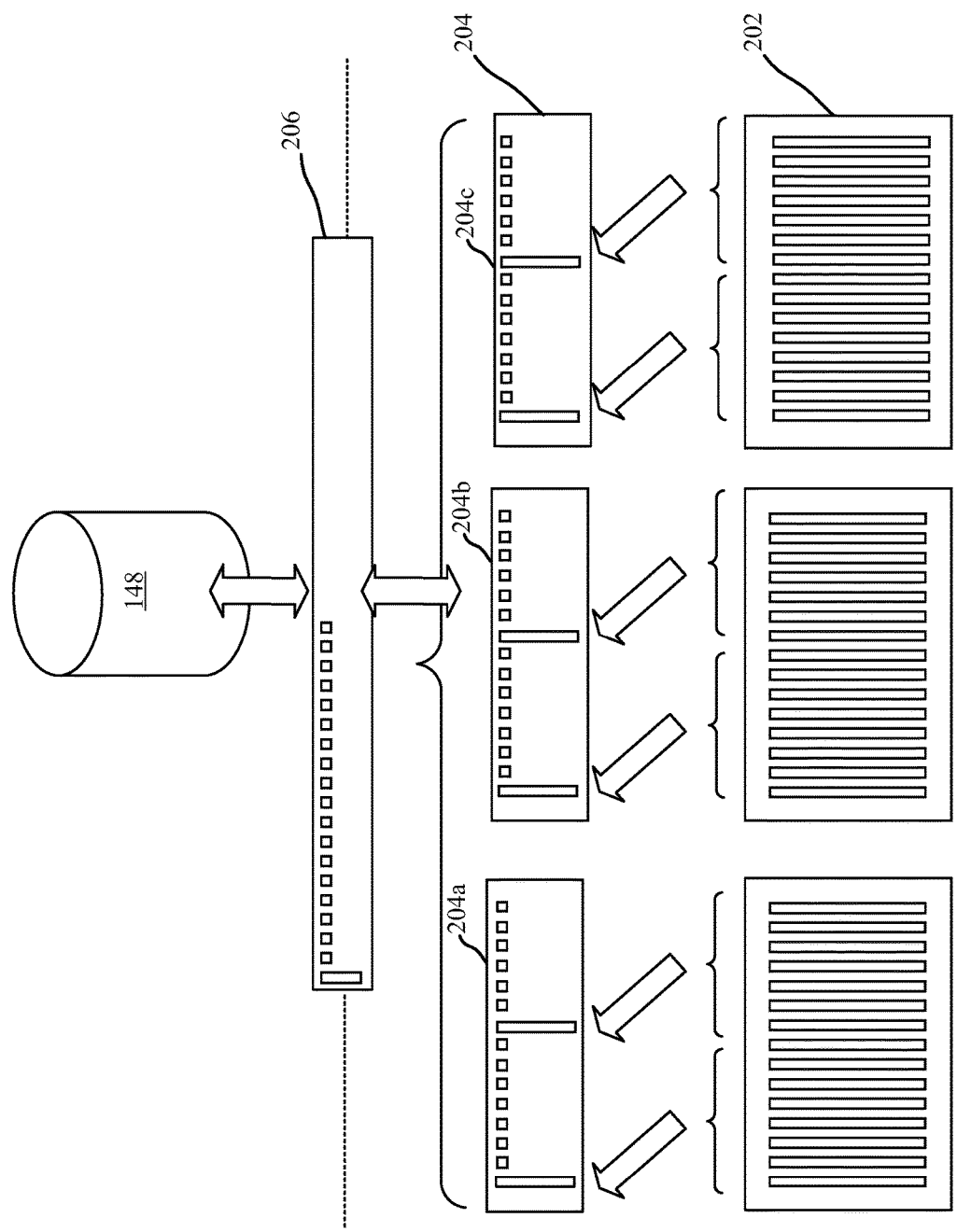
FIG. 2 is an example of a hierarchical surveillance video compression repository according to an aspect of the present disclosure.

Referring to FIG. 2, an example of a hierarchical surveillance video compression repository 148 is explained in accordance with one implementation. In the exemplary implementation, the hierarchical storage may employ at least three different tiers 202-206. In an aspect, the lowest tier 202 may receive raw, uncompressed video data consisting of individual image frames containing full image color data in a file format. Raw uncompressed video files may be passed through the codec susbsystem by the second tier 204 and may be used by the video compression repository 148 for subsequent processing. The codec susbsystem may be programmed to encode or decode a plurality of video formats.

In one aspect, the second tier 204 may use a standard codec, such as H.264 to convert the received raw data. The H.264 (also known as MPEG-4 Part 10 or MPEG-4 AVC) specification is a standard for video compression, and contains a number of features that allow it to compress video much more effectively than older standards and to provide more flexibility for application to a wide variety of network environments. The H.264 specification provides a provision for sending any individual macroblock of 16×16 pixels as a lossless block with PCM (pulse-code modulation) coding. PCM is a digital representation of an analog signal where the magnitude of the signal is sampled regularly at uniform intervals, then quantized to a series of symbols in a numeric (usually binary) code. In general, the H.264 specification only defines the final output stream and not the process by which it is obtained. In an aspect, the normal H.264 encoding process may be adapted slightly to optimize the use of lossy transmission for the content being stored in the remote image repository 148.

According to H.264 standard, the video signal is hierarchically divided into sequences, frames, series of consecutive macroblocks, macroblocks and blocks, and the block is the minimum processing unit. In the encoding process, the residual block data is obtained by performing intraframe or interframe prediction. In addition, residual data is compressed by performing conversion, quantization, scanning, run-length coding, and entropy coding. The decoding process is the reverse of the encoding process. Initially, the transform block coefficients that are formed during the entropy encoding process are extracted from the bitstream. Then, the residual block data is reconfigured by performing inverse quantization and inverse transform, and the prediction information is used to reconfigure the block video data.

More recently, the H.265/HEVC standard (ITU-T H.265 or ISO/IEC 23008-2) has been approved. For syntax according to the H.265/HEVC standard, the encoder splits the content of a picture (or slice or tile) into coding tree units. A coding tree unit ("CTU") includes luma sample values organized as a luma coding tree block ("CTB") and corresponding chroma sample values organized as two chroma CTBs. The size of a CTU (and its CTBs) is selected by the encoder. A luma CTB can contain, for example, 64×64, 32×32 or 16×16 luma sample values. A CTU includes one or more coding units. A coding unit ("CU") has a luma coding block ("CB") and two corresponding chroma CBs. For example, a CTU with a 64×64 luma CTB and two 64×64 chroma CTBs (YUV 4:4:4 format) can be split into four CUs, with each CU including a 32×32 luma CB and two 32×32 chroma CBs, and with each CU possibly being split further into smaller CUs. Or, as another example, a CTU with a 64×64 luma CTB and two 32×32 chroma CTBs (YUV 4:2:0 format) can be split into four CUs, with each CU including a 32×32 luma CB and two 16×16 chroma CBs, and with each CU possibly being split further into smaller CUs. The smallest allowable size of CU (e.g., 8×8, 16×16) can be signaled in the bitstream.

Generally, a CU has a prediction mode such as inter or intra. A CU includes one or more prediction units for purposes of signaling of prediction information (such as prediction mode details, displacement values, etc.) and/or prediction processing. A prediction unit ("PU") has a luma prediction block ("PB") and two chroma PBs. According to the H.265/HEVC standard, for an intra-predicted CU, the PU has the same size as the CU, unless the CU has the smallest size (e.g., 8×8). In that case, the CU can be split into four smaller PUs (e.g., each 4×4 if the smallest CU size is 8×8, for intra-picture prediction) or the PU can have the smallest CU size, as indicated by a syntax element for the CU. For symmetric or asymmetric partitions used in intra BC prediction, however, a larger CU can be split into multiple PUs. A CU also has one or more transform units for purposes of residual coding/decoding, where a transform unit ("TU") has a luma transform block ("TB") and two chroma TBs. A PU in an intra-predicted CU may contain a single TU (equal in size to the PU) or multiple TUs. The encoder decides how to partition video into CTUs, CUs, PUs, TUs, etc. In some example implementations, the encoder can switch color spaces, color sampling rates and/or bit depths on a CU-by-CU basis during encoding for CTUs, CUs, etc.

In H.265/HEVC implementations, a slice can include a single slice segment (independent slice segment) or be divided into multiple slice segments (independent slice segment and one or more dependent slice segments). A slice segment is an integer number of CTUs ordered consecutively in a tile scan, contained in a single network abstraction layer ("NAL") unit. For an independent slice segment, a slice segment header includes values of syntax elements that apply for the independent slice segment. For a dependent slice segment, a truncated slice segment header includes a few values of syntax elements that apply for that dependent slice segment, and the values of the other syntax elements for the dependent slice segment are inferred from the values for the preceding independent slice segment in decoding order.

As used herein, the term "block" can indicate a macroblock, residual data unit, CB, PB or TB, or some other set of sample values, depending on context. The term "unit" can indicate a picture, slice, macroblock, CTU, CU, PU, TU or some other set of blocks, or it can indicate a single block, depending on context.

In yet another aspect, the second tier 204 may use a H.266/VVC (Versatile Video Coding) encoding standard. The H.266 standard offers improved compression, which reduces data requirements by around 50% of the bit rate relative to the previous standard H.265 without compromising visual quality. In other words, H.266 offers faster video transmission for equal perceptual quality. It provides efficient transmission and storage of all video resolutions up to 8K while supporting high dynamic range video and omnidirectional 360° video.

These codecs are rather complex but employ similar concepts. The aforementioned codecs create key frames (such as I-frames Intraframe), which can recreate themselves entirely from their own encoded data. In other words, intraframes are the only frames in the media stream that contain enough information on themselves to reconstruct a complete image. They typically come with a periodicity of 0.5 to 5 seconds, depending on the encoding type.

In addition to intraframes, the aforementioned codecs create interframes (such as, P-frames, B-frames), which require surrounding frame data to recreate the image. Interframes can reduce data required to store the image by storing changes in the image from other frames that are referenced by the interframes, rather than the complete image. Predicted picture frames, or P-frames, which can be considered interframes, store only changes in the image from a previous frame, which can be an intraframe or another interframe, and can implicitly or explicitly reference the other frame from which the changes are stored, reducing the data required to store the image. Bidirectional predicted frames (B-frames)

can reduce data further by storing differences between the current frame and both preceding and following frames (such as the immediately preceding frame and the immediately following frame), and can implicitly or explicitly reference the frames of which the B-frame stores the difference.

It should be noted that each of the standards described above performs encoding at a file by file level. In other words, each video file is encoded/decoded on an individual basis. However, content in similar video files may be overlapping, which may lead to significant data duplications, especially in the context of surveillance video files. For example, units 204a, 204b, 204c may represent three different compressed video files. If these files contain similar content a significant data duplication may be observed as described below.

In the context of network transfer and for ease of decoding data, each of the standards above recommends intraframes to be frequent. All prior frames need to be decoded. However, this functionality is not required in the context of storage.

To illustrate an order of magnitude of data redundancy, assume that a continuous data storage can hold 180 days of security video data storage and that an intraframe is stored for every 2 seconds of video data. Also, assume that it takes 10 Kb to store an encoded intraframe. In this case, the amount of storage required for storing intraframes can be calculated as follows:

(86,400 s/day)*(180 days)*(1 intraframes/2 seconds)
*(10 Kb/intraframe)~77 GB

Advantageously, aspects of the present disclosure enable more optimal storage of video data by providing a third tier 206 that may be configured to analyze frames in a context of multiple video files, as shown in FIG. 2. This approach prevents data duplication by not storing frames that are repeated among different video files.

Figure 3:
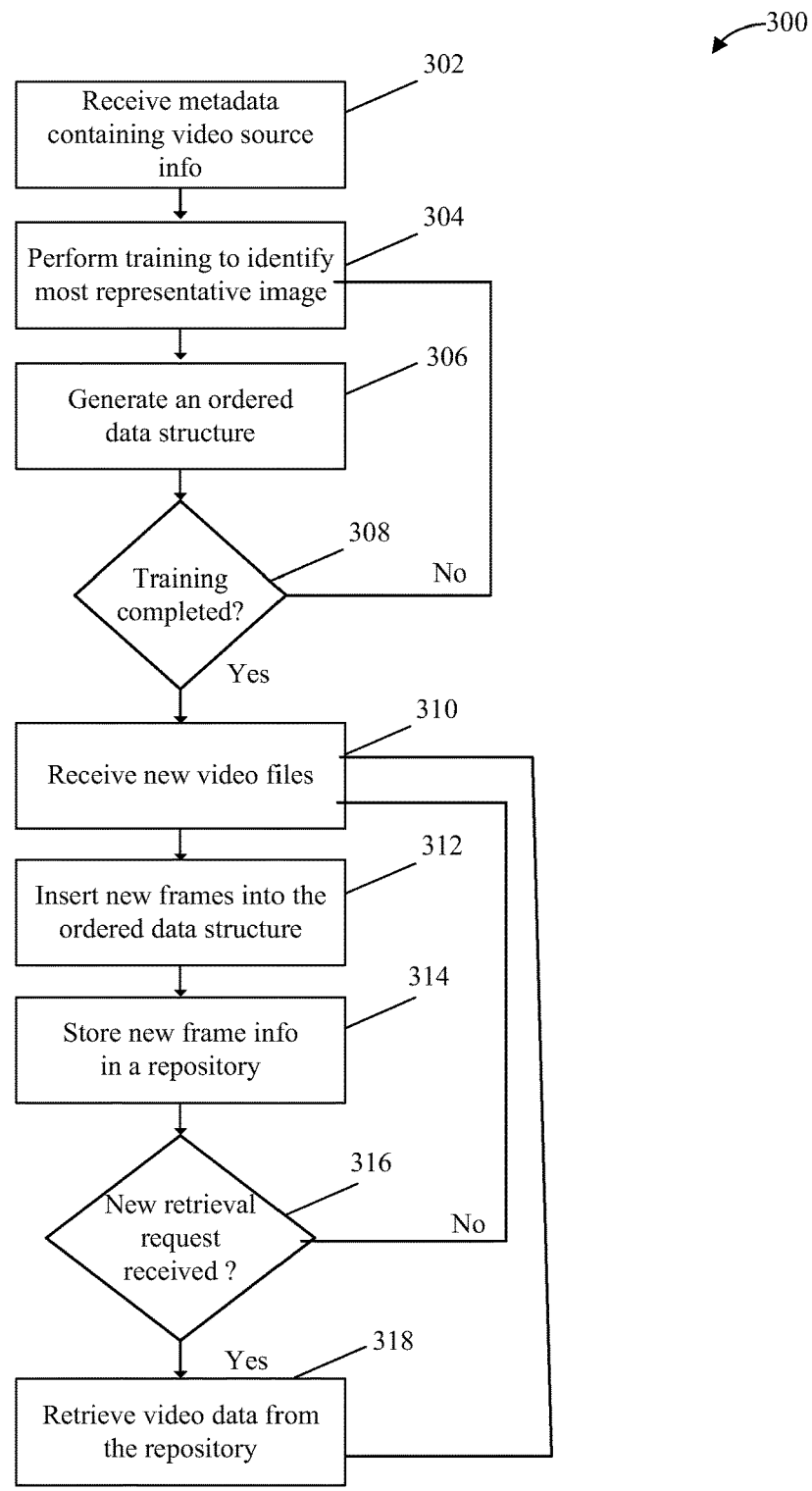
FIG. 3 is an example of a flow diagram of a method for processing video surveillance data according to an aspect of the present disclosure.
Figure 4:
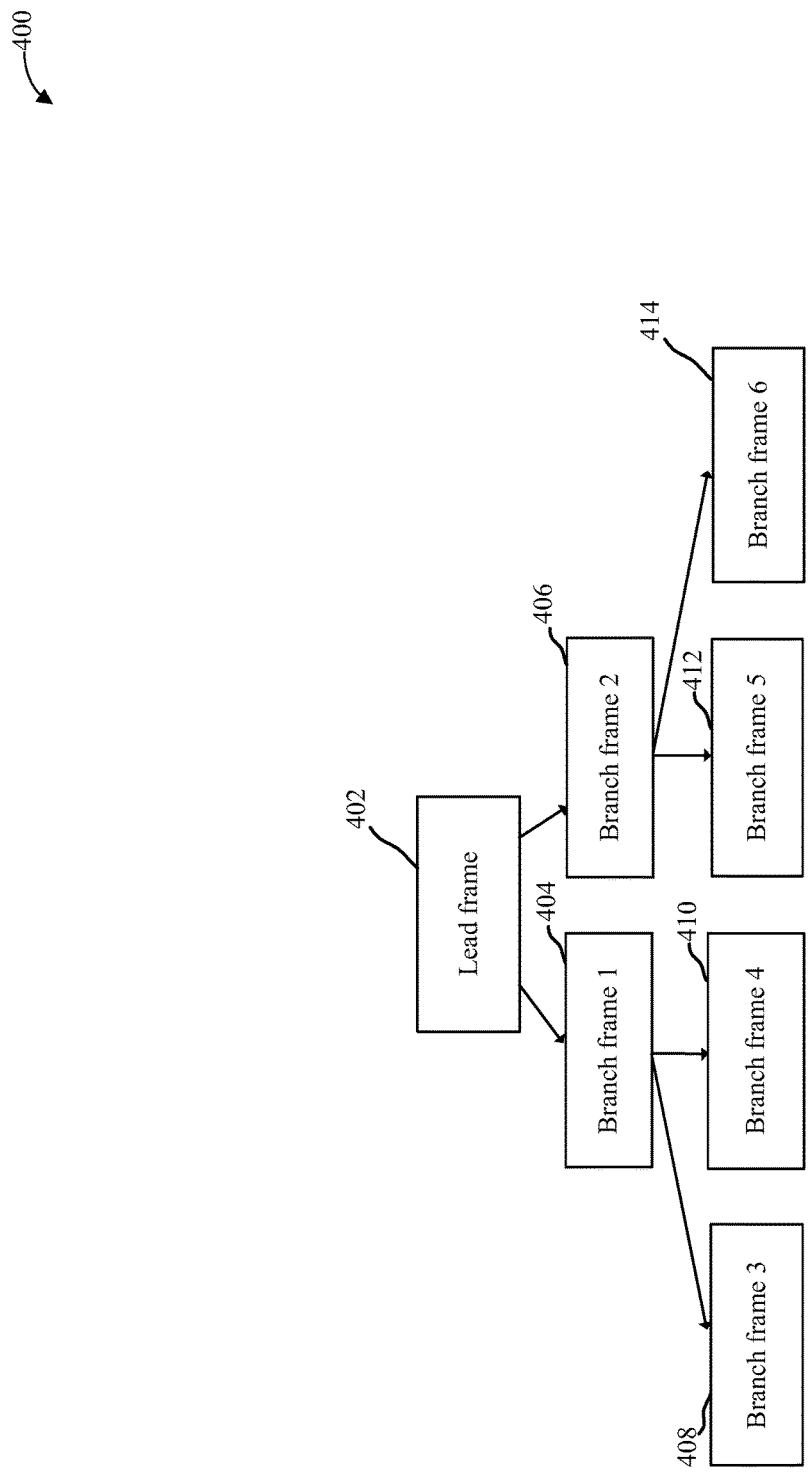
FIG. 4 is an example of a diagram of a data structure used for processing video surveillance data according to an aspect of the present disclosure.

Referring to FIG. 3, an example of a flow diagram of a method for processing video surveillance data according to an aspect of the present disclosure. FIGS. 1-2 and 4 may be referenced in combination with the flowchart of FIG. 3. To start, method 300 includes one or more image capture devices 110 attempting to store data in a repository, as described above. At step 302, the processing circuit 144 can receive from the one or more image capture devices 110 and/or from the video recorder 120 metadata containing at least an indication of a source of the video file. The indication of a source may include an identifier of the image capture device 110, as well as a location identifier (e.g., an identifier of the building). In some aspects, the processing circuit 144 maintains a mapping in the video compression repository 148 of indications of source to buildings or other entities—as such, when image frames are requested for retrieval from the video compression repository 148, the processing circuit 144 can use the indication of source to identify a plurality of streams of image frames to output that are associated with one another, such as by being associated with a plurality of image capture devices 110 that are located in the same building.

At step 304, the processing circuit 144 may start training the video analyzer 149. In an aspect, the training may be performed using a first plurality of surveillance video files, each of which includes a plurality of video frames. The purpose of the training is to teach the video analyzer 149 to identify one or more macroblocks of the video frames representing average content of the corresponding video file by comparing all intraframes with each other. In an aspect, the most representative information may be determined by calculating average pixel values for corresponding macroblocks. In an aspect, the video analyzer 149 may be configured to utilize a machine learning algorithm. In one non-limiting example, the training step may take, for example, 24 hours of video.

At step 306, as part of the training phase, the video analyzer 149 may generate an ordered data structure 400 (shown in FIG. 4) that can be used for processing future incoming video files. In an aspect, the ordered data structure 400 may contain a plurality of macroblocks of video frames contained in each of the first plurality of surveillance video files. In an aspect, the video analyzer 149 may generate this data structure 400 by sorting out image differences within the corresponding plurality of macroblocks. In one implementation, the ordered data structure may be a tree having a root node. If the training has not been completed yet (decision at 308, No branch), the video analyzer may return back to step 304.

If the training has been completed (decision at 308, Yes branch), the video analyzer 149 may start receiving a new set of video files that should be stored by the remote image repository 148 (at step 310). Each of the video files in this set will also contain a plurality of video frames. Next, at step 312, the video analyzer 149 may traverse the generated tree and insert new frames(macroblocks) into the generated ordered data structure 400. In other words, the video analyzer 149 may attempt to find the branch within the ordered data structure 400 that has minimum amount of differences with respect to the frame (macroblock) being analyzed. If such differences exceed a predefined threshold, new branches might be created, as described below in conjunction with FIG. 4.

At step 314, the video analyzer 149 may store new frame information in the remote image repository 148. In one non-limiting example, for each processed frame, the video analyzer 149 may create a record containing the following information: image capture device identifier, frame identifier, timestamp associated with the frame, reference to the closest branch and the difference from the closest branch in the generated ordered data structure 400, which may be represented as a byte array. In an aspect, the remote image repository will store this information for each frame included in the set of video files received at step 310.

In an aspect, at decision 316, the processing circuit 144 may determine if a new retrieval request was received from the user interface 152. For example, the user may send a query asking to retrieve a surveillance video capturing a time period between 2:30 PM and 2:45 PM on May $3^{rd}$. In response to determining that no new retrieval request was received, the processing circuit 144 may return to step 310 (decision at 316, No branch) and wait for additional video files. Alternatively (decision 316, Yes branch), the processing circuit 144 may retrieve the generated ordered data structure 400 and using the information contained therein retrieve the frame information and may recreate at least a portion of the original video file corresponding to the time period provided in the retrieval request (at 318). This step should be performed faster, as compared to conventional systems, due to reduced data redundancy, as described above.

In an aspect the method 300 may return to step 310 after responding to the user's request in order to store additional data, if needed.

In other words, the method 300 includes a method for processing video surveillance data. The method includes training a data repository, using a first plurality of surveillance video files including a first plurality of video frames, to identify one or more macroblocks of the video frames representing average content of the first plurality of surveillance video files. An ordered data structure of a plurality of macroblocks of video frames contained in each of the first plurality of surveillance video files is generated by sorting the plurality of macroblocks of video frames based on image differences within the plurality of macroblocks. The ordered data structure includes a root node. A second plurality of surveillance video files including a second plurality of video frames is received. The second plurality of video frames is inserted into the generated ordered data structure. References to the generated ordered data structure are stored in the data repository for each frame of the second plurality of video frames, along with information indicating differences between corresponding video frames and references.

In one or any combination of these aspects, the generated ordered data structure is retrieved, in response to receiving a retrieval request from a user and at least a portion of a surveillance video file is generated based on the retrieval request using the retrieved ordered data structure.

In one or any combination of these aspects, one or more image capture devices providing at least one of the first plurality or the second plurality of surveillance video files send metadata containing at least image capture device information and frame information, prior to training the data repository.

In one or any combination of these aspects, training the data repository engine includes analyzing, by the data repository, intraframes contained in the first plurality of surveillance video files.

In one or any combination of these aspects, the root node of the ordered data structure represents a macroblock representing an average image of all analyzed frames within an analyzed video surveillance file for a predefined period of time.

In one or any combination of these aspects, entropy encoding is performed to reduce differences between the analyzed frames contained in the second plurality of surveillance video files.

In one or any combination of these aspects, each branch of the ordered data structure represents a macroblock representation of frames having differences not exceeding a predefined threshold.

In one or any combination of these aspects, each branch of the ordered data structure is associated with a unique identifier stored in the data repository.

In one or any combination of these aspects, a format of the first plurality of surveillance video files and/or the second plurality of surveillance video files comprises one or more of: H.264, H.265, or H.266.

FIG. 4 is a diagram of a data structure used for processing video surveillance data, according to an aspect of the present disclosure. In one example implementation, the generated data structure 400 may comprise a tree having a root node. In an aspect, the root node may be a lead frame 402. As described above, the lead frame 402 may be an average macroblock representation of all frames for a given time period (for example, 24 hours). In this example implementation, the video analyzer 149 may create branches (for example, branches 404 and 406) by detecting differences from the lead frame 402. Each branch 402-414 of the ordered data structure 400 represents a macroblock representation of frames having differences not exceeding a predefined threshold. In one example, the first branch 404 may represent a day time average frame, while the second branch 406 may represent a night time average frame. As illustrated in FIG. 4, after a certain number of frame splits a tree structure 400 can be formed.

As illustrated in FIG. 4, the first branch 404 and second branch 406 may be split even further. For example, assume that frames 402-406 are associated with a surveillance video file of a particular parking lot. Furthermore, assume that at this parking lot, a first car typically parks every day between 11 AM and 3 PM, while a second car parks every night between 1 AM and 3 AM. In this scenario, the third frame 408 may represent a day time frame with the image of the first car parked, wherein the fourth frame 410 may represent a day time frame without the first car parked. Similarly, the fifth frame 412 may represent a night time frame with the image of the second car parked, wherein the sixth frame 414 may represent a night time frame without the second car parked.

However, it should be noted that the generated ordered data structure 400 should have a predefined depth and/or breadth in order to have an optimal performance. If the tree structure 400 is too broad and/or too deep, the performance of both retrieval and storage operations may suffer. In an aspect, the breadth and depth of the tree structure 400 may be configured for a particular video surveillance storage environment 100 to optimize performance of the system. For example, there might be a configurable parameter controlling a maximum amount of branches that can be generated by the video analyzer 149. Furthermore, branches 402-414 within the data structure 400 may be re-ordered dynamically as more video files are coming in, when the particular branches 402-414 are no longer representative of new images. In an aspect, each branch 402-414 may have a unique identifier that may be stored in the video compression repository 148.

Aspects of the present disclosure may be implemented using hardware, software, or a combination thereof and may be implemented in one or more computer systems or other processing systems. In one aspect, the disclosure is directed toward one or more computer systems capable of carrying out the functionality described herein.

In yet another example variation, aspects of the disclosure are implemented using a combination of both hardware and software.

The aspects of the disclosure discussed herein may also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media may include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method for processing video surveillance data comprising:
    calculating average pixel values of corresponding macroblocks in intraframes in each of a first plurality of surveillance video files comprising a first plurality of video frames over a period of time;
generating an ordered data structure of a plurality of macroblocks of video frames contained in each of the first plurality of surveillance video files by sorting the plurality of macroblocks of video frames based on image differences within the plurality of macroblocks, wherein the ordered data structure includes a root node, wherein the root node comprises a frame that comprises one or more macroblocks having the average pixel values;
receiving a second plurality of surveillance video files comprising a second plurality of video frames;
inserting the second plurality of video frames into the ordered data structure; and
storing, in a data repository, references to the ordered data structure for each frame of the second plurality of video frames and a difference between corresponding video frames and the references.

2. The method of claim 1, further comprising:
retrieving the ordered data structure, in response to receiving a retrieval request from a user; and
generating at least a portion of a surveillance video file based on the retrieval request using the ordered data structure.

3. The method of claim 1, further comprising:
sending, to the data repository, by one or more image capture devices providing at least one of the first plurality of surveillance video files or the second plurality of surveillance video files, metadata containing at least image capture device information and frame information, prior to calculating the average pixel values.

4. The method of claim 1, further comprising performing entropy encoding to reduce differences between analyzed frames contained in the second plurality of surveillance video files.

5. The method of claim 1, wherein each branch of the ordered data structure represents a macroblock representation of frames having differences not exceeding a predefined threshold.

6. The method of claim 5, wherein each branch of the ordered data structure is associated with a unique identifier stored in the data repository.

7. The method of claim 1, wherein a format of the first plurality of surveillance video files and/or the second plurality of surveillance video files comprises one or more of: H.264, H.265 or H.266.

8. A system for processing video surveillance data comprising:
a hardware processor configured to:
calculate average pixel values of corresponding macroblocks in intraframes in each of a first plurality of surveillance video files comprising a first plurality of video frames over a period of time;
generate an ordered data structure of a plurality of macroblocks of video frames contained in each of the first plurality of surveillance video files by sorting the plurality of macroblocks of video frames based on image differences within the plurality of macroblocks, wherein the ordered data structure includes a root node, wherein the root node comprises a frame that comprises one or more macroblocks having the average pixel values;
receive a second plurality of surveillance video files comprising a second plurality of video frames;
insert the second plurality of video frames into the ordered data structure; and
store, in a data repository, references to the ordered data structure for each frame of the second plurality of video frames and a difference between corresponding video frames and references.

9. The system of claim 8, wherein the hardware processor is further configured to:
retrieve the ordered data structure, in response to receiving a retrieval request from a user; and
generate at least a portion of a surveillance video file based on the retrieval request using the ordered data structure.

10. The system of claim 8, wherein the hardware processor is further configured to:
send, to the data repository, by one or more image capture devices providing at least one of the first plurality of surveillance video files or the second plurality of surveillance video files, metadata containing at least image capture device information and frame information, prior to calculating the average pixel values.

11. The system of claim 8, wherein the hardware processor is further configured to perform entropy encoding to reduce differences between analyzed frames contained in the second plurality of surveillance video files.

12. The system of claim 8, wherein each branch of the ordered data structure represents a macroblock representation of frames having differences not exceeding a predefined threshold.

13. The system of claim 12, wherein each branch of the ordered data structure is associated with a unique identifier stored in the data repository.

14. The system of claim 8, wherein a format of the first plurality of surveillance video files and/or the second plurality of surveillance video files comprises one or more of H.264, H.265 or H.266.

* * * * *